March 10, 1925.

A. H. WUNDERLIN

FISH BAIT

Filed July 14, 1923

1,529,459

August H. Wunderlin, INVENTOR

BY

J. G. Burns ATTORNEY

Patented Mar. 10, 1925.

1,529,459

UNITED STATES PATENT OFFICE.

AUGUST H. WUNDERLIN, OF FORT WAYNE, INDIANA.

FISH BAIT.

Application filed July 14, 1923. Serial No. 651,490.

*To all whom it may concern:*

Be it known that I, AUGUST H. WUNDER-LIN, a citizen of the United States of America, and resident of Fort Wayne, in the county of Allen and State of Indiana, have invented certain new and useful Improvements in Fish Baits, of which the following is a specification.

This invention relates to improvements in artificial fish baits and the objects thereof are to afford a lure having an electric lamp that receives current from a battery carried therein, and constructed so that connection between the battery and lamp may be made or broken by adjustably manipulating the body of the lure, and a further object is to construct the bait and arrange the battery and lamp therein so as to obviate the use of electric wire connections.

These objects are accomplished by the construction illustrated in the accompanying drawings, in which:—

The characters appearing in the description refer to parts shown in the drawings and designated thereon by corresponding characters.

Figure 1:
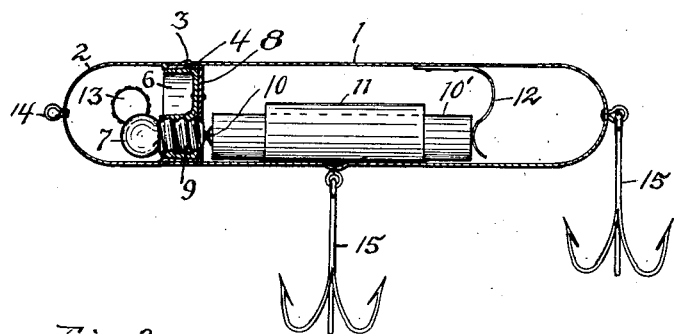
Fig. 1 is a longitudinal section of a fish bait embodying the invention.
Figure 2:
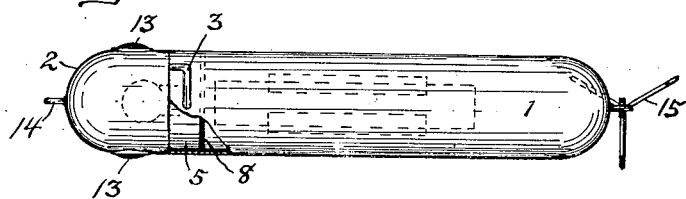
Fig. 2 is a top plan view projected from Fig. 1, there being a portion broken away; and, Fig. 3 is a front end view of the bait, the head end thereof being omitted.
Figure 3:
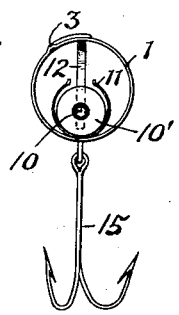

The invention comprises a float having two separable parts 1 and 2 telescopically connected together, there being a channel 3 made in the forward end of the body portion 1 of the float for the reception of a corresponding projection 4 that is made in the flange 5 on the head portion 2 for holding the parts together.

Within the flange 5 of the head part 2 is positioned a base 6 in which is held a miniature electric lamp 7, and on the rear face of the base 6 is secured an insulating disc 8 that fits the bore of the body part 1 and bears against the rear end of the flange 5 of the head part 2. The rear end of the lamp base 9 projects through the disc and its end terminal has normal contact with the end terminal 10 of the battery 10' that is held within the body part 1 of the float at the bottom thereof by a cradle 11 secured therein and which loosely holds the battery in normal position. A spring 12 acts against the rear end of the battery so that it will be moved forwardly thereby with its front end in proper electrical connection with the terminal of the lamp.

The head part 2 has in each side thereof a glass closed aperture 13 through which is emitted the light of the lamp. The head part also has a loop 14 fixed at its front for the attachment of a fish line. The body part 1 of the float has attached thereto in suitable arrangement a number of hooks 15.

The float is so proportioned as to sustain itself with its contents approximately at the surface of the water, and the hooks are connected in such positions on the float as to cause the float to be sustained level when in the water.

In utilizing the invention the body of the battery 10' has electrical contact with the cradle 11 which is secured to the float body, and the lamp 9 has electrical contact with the base which also has contact with the float body so that when the lamp and battery are aligned and in contact with each other, an electrical circuit is formed through the battery, the lamp, the float body and the cradle, and thus the lamp is supplied with current. By turning the head part 2 of the float relative to the part 1 thereof, the lamp and battery are moved out of alinement so that the end terminal of the battery will then bear against the insulating plate 8, thus opening the electrical circuit. By constructing the invention as set forth, the electrical circuit may be closed or opened by simply manipulating the head of the float, and the battery when exhausted may be replaced by a new one without the use of connecting wires and similar devices for making electrical connections.

What I claim is:

1. In an artificial fish bait, a hollow hook-supporting float having separable head and body parts connected together upon a common axis and being adjustably rotatable relative to each other, the head part having in each side thereof a glass closed aperture; a base removably positioned in the head part; an insulating plate fixed on the back of the base; an electric lamp located in said head part and mounted in said base eccentric of the center thereof with its end terminal projecting through said plate; and an electric battery in the body part secured in a position therein eccentric to the axis thereof and with its end terminal movable into direct contact with the end terminal of the lamp by turning said body and head parts relatively.

2. In an artificial fish bait, a hollow hook-supporting float having separable head and body parts alined upon a common axis and being relatively rotatable, the head part having glass closed apertures; an electric lamp mounted in said head part eccentric to the axis thereof; a cradle within said body part at the bottom thereof; a spring pressed electric battery positioned loosely in the cradle eccentric of the axis of the body part and with its end terminal movable into direct contact with the end terminal of the lamp by turning said body and head parts relatively.

3. In an artificial fish bait, a hollow hook-supporting float having separable head and body parts alined upon a common longitudinal axis and being relatively rotatable, the head part having glass closed apertures; and an electric lighting means within the float comprising an electric lamp located in the head part and an electric battery therefor located in the body part with its axis below that of the float and being movable into and out of direct contact with the lamp by turning said body and head parts relatively upon the axis thereof, said battery being located in the float so as to be operable in stabilizing the position thereof when the float is suspended in water.

In testimony whereof I affix my signature in presence of two witnesses.

AUGUST H. WUNDERLIN.

Witnesses:
MATILDA METTLER,
W. G. BURNS.